United States Patent
Kilian et al.

(10) Patent No.: US 7,694,117 B2
(45) Date of Patent: Apr. 6, 2010

(54) VIRTUALIZED AND ADAPTIVE CONFIGURATION OF A SYSTEM

(75) Inventors: Frank Kilian, Mannheim (DE); Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 482 days.

(21) Appl. No.: 11/322,400

(22) Filed: Dec. 30, 2005

(65) Prior Publication Data
US 2007/0156388 A1 Jul. 5, 2007

(51) Int. Cl.
*G06F 15/16* (2006.01)
(52) U.S. Cl. .......................... 713/1; 713/100; 717/177
(58) Field of Classification Search .................... 713/1, 713/100; 703/27; 717/177
See application file for complete search history.

(56) References Cited

U.S. PATENT DOCUMENTS

| | | | |
|---|---|---|---|
| 5,479,599 A | 12/1995 | Rockwell et al. | |
| 5,608,865 A | 3/1997 | Midgely et al. | |
| 5,758,154 A | 5/1998 | Qureshi | |
| 5,832,503 A | 11/1998 | Malik et al. | |
| 5,996,012 A | 11/1999 | Jarriel | |
| 6,041,347 A | 3/2000 | Harsham et al. | |
| 6,055,227 A | 4/2000 | Lennert et al. | |
| 6,148,277 A | 11/2000 | Asava et al. | |
| 6,161,176 A | 12/2000 | Hunter et al. | |
| 6,209,018 B1 | 3/2001 | Ben-Shachar et al. | |
| 6,314,460 B1 | 11/2001 | Knight et al. | |
| 6,341,372 B1 | 1/2002 | Datig | |
| 6,397,378 B1 | 5/2002 | Grey et al. | |
| 6,421,719 B1 | 7/2002 | Lewis et al. | |
| 6,490,690 B1 | 12/2002 | Gusler et al. | |
| 6,735,691 B1 | 5/2004 | Capps et al. | |
| 6,871,221 B1 | 3/2005 | Styles | |
| 6,898,703 B1 * | 5/2005 | Ogami et al. | 713/2 |
| 6,925,646 B1 | 8/2005 | Korenshtein et al. | |
| 6,950,931 B2 * | 9/2005 | Wedlake | 713/2 |
| 6,996,517 B1 * | 2/2006 | Papaefstathiou | 703/22 |
| 7,054,924 B1 | 5/2006 | Harvey et al. | |
| 7,167,974 B2 | 1/2007 | Roth et al. | |
| 7,188,335 B1 * | 3/2007 | Darr et al. | 717/121 |
| 7,246,345 B1 | 7/2007 | Sharma et al. | |
| 7,260,818 B1 | 8/2007 | Iterum et al. | |

(Continued)

FOREIGN PATENT DOCUMENTS

EP 1486867 12/2004

(Continued)

OTHER PUBLICATIONS

"PCT/EP2006/012357 ISR and WO mailed Mar. 29, 2007".

(Continued)

*Primary Examiner*—Thuan N Du
(74) *Attorney, Agent, or Firm*—Schwegman, Lundberg & Woessner, P.A.

(57) ABSTRACT

A method and apparatus for virtualized and adaptive configuration. An embodiment of a method includes generating a system configuration. The configuration includes a setting, with the setting having an abstract value to be resolved based at least in part on a characteristic of a system. The configuration is installed in a recipient system, and a value is resolved for the setting based at least in part on a characteristic of the recipient system.

16 Claims, 5 Drawing Sheets

U.S. PATENT DOCUMENTS

| | | | |
|---|---|---|---|
| 7,320,007 | B1 | 1/2008 | Chang |
| 7,343,601 | B2 | 3/2008 | Azagury et al. |
| 7,373,661 | B2 | 5/2008 | Smith et al. |
| 7,412,687 | B2 | 8/2008 | Goodwin et al. |
| 7,447,701 | B2 | 11/2008 | Agarwal et al. |
| 7,480,643 | B2 | 1/2009 | Barsness et al. |
| 2003/0041235 | A1* | 2/2003 | Meyer .......................... 713/1 |
| 2003/0055529 | A1* | 3/2003 | Aosawa ...................... 700/220 |
| 2003/0221094 | A1 | 11/2003 | Pennarun |
| 2003/0225867 | A1 | 12/2003 | Wedlake |
| 2004/0162930 | A1 | 8/2004 | Forin et al. |
| 2004/0187140 | A1 | 9/2004 | Aigner et al. |
| 2004/0205584 | A1 | 10/2004 | Pezzanite |
| 2004/0230787 | A1* | 11/2004 | Blumenau et al. .............. 713/1 |
| 2005/0005005 | A1 | 1/2005 | Styles et al. |
| 2005/0050175 | A1 | 3/2005 | Fong et al. |
| 2005/0065993 | A1 | 3/2005 | Honda et al. |
| 2005/0071195 | A1 | 3/2005 | Cassel et al. |
| 2005/0085937 | A1 | 4/2005 | Goodwin et al. |
| 2005/0144428 | A1 | 6/2005 | Rothman et al. |
| 2005/0144528 | A1 | 6/2005 | Bucher et al. |
| 2005/0144610 | A1 | 6/2005 | Zenz |
| 2005/0240667 | A1 | 10/2005 | Koegel |
| 2005/0289169 | A1 | 12/2005 | Adya et al. |
| 2006/0041595 | A1 | 2/2006 | Taguchi et al. |
| 2006/0041881 | A1 | 2/2006 | Adkasthala |
| 2006/0047798 | A1 | 3/2006 | Feinleib et al. |
| 2006/0064673 | A1 | 3/2006 | Rogers et al. |
| 2006/0123409 | A1 | 6/2006 | Jordan, III et al. |
| 2006/0165123 | A1 | 7/2006 | Jerrard-Dunne et al. |
| 2006/0242626 | A1 | 10/2006 | Pham et al. |
| 2007/0094359 | A1 | 4/2007 | Lamoureux |
| 2007/0118654 | A1 | 5/2007 | Jamkhedkar |
| 2007/0118888 | A1 | 5/2007 | Styles |
| 2007/0143480 | A1 | 6/2007 | Arroyo et al. |
| 2007/0156389 | A1 | 7/2007 | Kilian et al. |
| 2007/0156432 | A1 | 7/2007 | Mueller et al. |
| 2007/0156641 | A1 | 7/2007 | Mueller |
| 2007/0156715 | A1 | 7/2007 | Mueller |
| 2007/0156717 | A1 | 7/2007 | Zenz et al. |
| 2007/0157010 | A1 | 7/2007 | Zenz |
| 2007/0157172 | A1 | 7/2007 | Zenz et al. |
| 2007/0157185 | A1 | 7/2007 | Semerdzhiev et al. |
| 2007/0162892 | A1 | 7/2007 | Zenz et al. |
| 2007/0165937 | A1 | 7/2007 | Mladen et al. |
| 2007/0168965 | A1 | 7/2007 | Zenz |
| 2007/0257715 | A1 | 11/2007 | Semerdzhiev et al. |

FOREIGN PATENT DOCUMENTS

| | | |
|---|---|---|
| GB | 2374687 | 10/2002 |
| WO | WO-96/26588 | 8/1996 |
| WO | WO-2004109978 | 12/2004 |
| WO | WO-2005045670 | 5/2005 |

OTHER PUBLICATIONS

Annonymous, "Using a Template Processor to Simplify Programming", *Research Disclosure, Mason Publications*, Hampshire, GB, vol. 41, No. 413, (Sep. 1, 1998),1-3.

Int'l Application No. PCT/EP2006/012358 *Int'l Search Report & Written Opinion* dated Jun. 14, 2007; 5 pgs.

Int'l Application No. PCT/EP2006/012421, *Int'l Search Report & Written Opinion* dated Oct. 2, 2007; 14 pages.

Heiss, Kurt , "Oracle Process Manager and Notification Server Administrator's Guide, 10g Release 2 (10.1.2)", 10g Release 2 (10. 1.2) Dec. 2004 XP002449016: Redwood City, CA, USA, Retrieved from the Internet: URL: http://download.oracle.com/docs/cd/B14 [ret'd on Aug. 31, 2007], (Dec. 2004). pp. 1-1 to pp. 1-26 and pp. 3-1 to pp. 3-30.

PCT/EP2006/012356 *International Search Report and Written Opinion* Mailed Mar. 29, 2007 6570P322.

"OA Mailed Feb. 20, 2008 for U.S. Appl. No. 11/322,608", (Feb. 20, 2008), Whole Document.

USPTO, "OA Mailed May 22, 2008 for U.S. Appl. No. 11/322,401", (May 22, 2008), Whole Document.

USPTO, "OA mailed Jan. 8, 2008 for U.S. Appl. No. 11/322,607", (Jan. 8, 2008), Whole Document.

USPTO, "Office Action mailed Mar. 19, 2008 for U.S. Appl. No. 11/322,701", Whole Document.

USPTO, Office Action mailed Jun. 26, 2008 for U.S. Appl. No. 11/322,607.

Final Office Action for U.S. Appl. No. 11/322,608 Mailed Sep. 4, 2008, whole document., Whole Document.

Final Office Action for U.S. Appl. No. 11/322,401 Mailed Nov. 19, 2008, whole document., Whole Document.

Non-Final Office Action for U.S. Appl. No. 11/323,110 Mailed Nov. 26, 2008, whole document., Whole Document.

Non-Final Office Action for U.S. Appl. No. 11/324,125, Mailed Jan. 23, 2009, whole document., Whole Document.

Non-Final Office Action for U.S. Appl. No. 11/322,511, Mailed Jan. 22, 2009, whole document., Whole Document.

Non-Final Office Action for U.S. Patent Application No. 11/322,608, Mailed Feb. 13, 2009, 10 pages.

Accomazzi, Alberto , et al., "Mirroring the Ads Bibliographic Databases", *Astronomical Analysis Software and Systems VII*, ASP Conference Series, vol. 145, (1998), 395-399.

Bartell, Randy L., et al., "The Mediaxact System—A Framework for Personalized Electronic Commerce Systems", Bell Labs Technical Journal, vol. 4, Issues 153-173, (Apr.-Jun. 1999), 153-173.

Cutler, Ellie , "SCO UNIX in a Nutsell", *O'Reilly & Associates, Inc., Cambridge, MA*, (Jan. 1994), 154-158.

Duquette, William H., et al., "Data Definition and Code Generation in TCL", *Ride-VE '99*, Sydney, Australia, (Mar. 23-24, 1999), 1-10.

Feiler, P.H. , et al., "Software Process Support Through Software Configuration Management", IEEE, (1990), 58-60.

Fernandez, Mary , et al., "Silkroute: Trading Between Relations and XML", *Computer Networks*, vol. 33, Issues 1-6, (Jun. 2000), 723-745.

Hatley, John W., "Automatically Generating Procedure Code and Database Maintenance Scripts", *Ingres World, Chicago, IL*, (Oct. 2-6, 1994), 1-11.

Microsoft Press, "Microsoft Computer Dictionary", 4th *Edition, Redmond, WA*, (1999), 123 and 183.

Schlee, et al., "Generative Programming of Graphical User Interfaces", ACM, (2004), 403-406.

USPTO, "6570P324 FOA dated Sep. 2, 2008, U.S. Appl. No. 11/322,701", (Sep. 2, 2008), Whole Document.

"U.S. Appl. No. 11/322,401, Advisory Action mailed Feb. 26, 2009", 5 pgs.

"U.S. Appl. No. 11/322,401, Final Office Action mailed Nov. 19, 2008", 7 pgs.

"U.S. Appl. No. 11/322,401, Non Final Office Action mailed May 21, 2009", 10 pgs.

"U.S. Appl. No. 11/322,401, Non Final Office Action mailed May 22, 2008 ", 7 pgs.

"U.S. Appl. No. 11/322,401, Notice of Allowance mailed Dec. 31, 2009", 4 Pgs.

"U.S. Appl. No. 11/322,401, Preliminary Amendment filed Mar. 16, 2009", 11 pgs.

"U.S. Appl. No. 11/322,401, Response filed Feb. 19, 2009 to Final Office Action mailed Nov. 19, 2008", 7 pgs.

"U.S. Appl. No. 11/322,401, Response filed Aug. 22, 2008 to Non Final Office Action mailed May 22, 2008", 17 pgs.

"Application Serial No. 11/322,401, Response filed Sep. 16, 2009 to Non Final Office Action mailed May 23, 2009", 10 pgs.

"U.S. Appl. No. 11/322,509, Non Final Office Action mailed Jan. 14, 2009", 11 pgs.

"U.S. Appl. No. 11/322,607, Non Final Office Action mailed Jan. 8, 2008", 10 pgs.

"U.S. Appl. No. 11/322,608, Final Office Action mailed Jul. 8, 2009", 9 pgs.

"U.S. Appl. No. 11/322,969, Non-Final Office Action mailed Apr. 1, 2009", 11 pgs.

"U.S. Appl. No. 11/322,969, Response filed Jun. 9, 2009 to Non Final Office Action mailed Apr. 1, 2009", 11 pgs.

"U.S. Appl. No. 11/323,110, Notice of Allowance mailed Oct. 20, 2009", 6 pgs.

"U.S. Appl. No. 11/323,438, Non Final Office Action mailed Apr. 1, 2009", 21 pgs.

"U.S. Appl. No. 11/323,438, Response filed Jun. 30, 2009 to Non Final Office Action mailed Apr. 1, 2009", 14 pgs.

"U.S. Appl. No. 11/322,701, Final Office Action mailed Sep. 2, 2008", 16 pgs.

"U.S. Appl. No. 11/322,701, Non-Final Office Action mailed Jul. 6, 2009", 15 pgs.

"U.S. Appl. No. 11/323,110, Non Final Office Action mailed Nov. 26, 2008", 10 pgs.

"U.S. Appl. No. 11/323,110, Notice of Allowance mailed May 29, 2009", 9 pgs.

"U.S. Appl. No. 11/323,110, Response filed Feb. 25, 2009 to Non Final Office Action mailed Nov. 26, 2008", 9 pgs.

"U.S. Appl. No. 11/323,110, Response filed Oct. 27, 2008 to Restriction Requirement mailed Aug. 27, 2008", 10 pgs.

"U.S. Appl. No. 11/323,110, Restriction Requirement mailed Aug. 27, 2008 ", 7 pgs.

"International Application Serial No. PCT/EP2006/012357, International Search Report and Written Opinion mailed Mar. 29, 2007", (Mar. 29, 2007), 9 pgs.

"J2EE Engine Bootstrap", *BIS Techdev*, printed on Sep. 26, 2005, http://bis.wdf.sap.corp/twiki/bin/view/Techdev/J2EEEngineBootstrap, 1-15.

Feller, Peter H., "Software Process Support Through Software Configuration Management", *IEEE*, (1990), 58-60.

Hall, et al., "Design: A Generic Configuration Shell, Proc of the 3rd International Conf. on industrial and engineering applications of artificial intelligence and expert systems", vol. 1, *Charleston, SC 1990*, (1990), 500-508 pgs.

Karlsson, et al., "Method Configuration: Adapting to situational characteristics while creating reusable assets", *Information and software technology*, vol. 46, Issue 9, (Jul. 1, 2004), 619-633 pgs.

Leffler, et al., "Building Berkeley UNIX Kernels with Config", *Computer Sytems reserach Group*, (Apr. 17 1991), 2-1 and 2-31 pgs.

Robbins, et al., "Unix in a nutshell", 3rd edition, O'Reily & Associates, Inc, (Aug. 1999), 215-221 and 265-266 pgs.

Schwanke, et al., "Configuration Management in BiiN SMS", *Proc. of the 11th International Conf. on software enginerring Piitsburgh*, (383-393 pgs), 1989.

Symantec, Corp., "Norton Ghost™ User's Guide", *Norton Ghost™ User's Guide -Symantec. Norton Ghost the fast pc cloning solution.*, (1999), 138 pgs.

Williams, et al., "Embedded Linux as a platform for dynamically self-reconfiguration systems-ON-CHIP", (21-24 pgs), 163-169 pgs.

* cited by examiner

VIRTUALIZED AND ADAPTIVE CONFIGURATION OF A SYSTEM

TECHNICAL FIELD

Embodiments of the invention generally relate to the field of computer systems and, more particularly, to a method and apparatus for virtualized and adaptive configuration of a system.

BACKGROUND

In complex computer systems, the development of a configuration for each particular computer environment can be difficult, and is often a matter of experimentation and guesswork to develop a working model. Because a complex system may include many disparate environments, this generally requires repeating the development process numerous times as various systems in different locations are configured.

If a configuration is developed for a system and is found to operate effectively, this generally is of little help for other systems. In a conventional operation, a developer or user may wish to copy a configuration over to another system or to develop a configuration for use in multiple systems, but this is generally not possible because of system dependencies built into the configuration. Certain elements of the configuration will depend on the characteristics of the individual computer systems that are configured, and such characteristics will generally be different for each system that is encountered.

A conventional system configuration is static, and thus is not adaptable to new environments. If a developer or user wishes to copy a working configuration for one system to another system or to develop a configuration for use in multiple computer systems, it is necessary to identify all system dependent configuration elements, to determine how the system dependent configuration elements need to be set to operate in each system, and then to set these configuration elements. Thus, the transfer of a configuration from one system to another is a time-consuming process, and the effort required to correct problems severely limits any advantage that might be gained in copying system configurations or attempting to a common configuration for multiple different systems.

SUMMARY OF THE INVENTION

A method and apparatus for virtualized and adaptive configuration are described. In one aspect of the invention, a method includes generating a system configuration. The configuration includes a setting, with the setting having an abstract value to be resolved based at least in part on a characteristic of a system. The configuration is installed in a recipient system, and a value is resolved for the setting based at least in part on a characteristic of the recipient system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a method and apparatus for providing virtualized and adaptive configuration of a system.

As used herein, a "configuration" describes the manner in which a computer system, device, component, or other element, including any hardware, software, or both, is set up. A configuration may include, but is not limited to, the system name, the amount of memory available, the number of CPUs (central processing units) available, and other related information. A configuration may be described in various different ways in different settings, and may have a different name or designation in certain environments. To reduce repetitiveness in this description, a computer system, device, component, or other element may be referred to generally as a computer system or system. In this description, the computer system that receives a configuration may also be referred to as a configuration recipient or configuration consumer.

In an embodiment of the invention, a configuration may be transferred between computer systems. For example, when a configuration has been developed for a system that works well for a certain use, that same configuration may be exported to another system that is different than the first system. In an embodiment, a configuration may be developed or generated for multiple different systems that have differing characteristics. In an embodiment of the invention, a configuration is virtualized for the elements of each system and is adaptable to each system. For example, a software vendor may utilize an embodiment of the invention to develop a self-adapting configuration together with a software product. In this example, the self-adapting configuration may be shipped together with the product in order to minimize configuration overhead for the customer. Software may include instructions stored on a computer-readable medium for execution by a processor.

In an embodiment of the invention, a system configuration utilizes abstract elements that are not dependent on the characteristics of any particular system. In an embodiment, the abstract elements of a configuration are resolved at run-time to generate values that apply to a particular computer system. As used herein, "abstract" means that an element has a value to be determined that is not tied to a particular system, use, or setting. The value of the element is thus expressed in an abstract fashion, with the value resolvable to a specific value in relation to a particular system that is assigned to the configuration.

In an embodiment of the invention, a system configuration is dynamic, and the determination of the settings for the configuration is based on the nature of each computer system and changes that may occur in a system. A dynamic configuration contrasts with a static configuration in a conventional system, in which the configuration elements need to be modified to work in a particular system. The elements of a dynamic configuration change as the configuration is applied to a system, and may be modified dynamically as the system is modified in order to reflect current values. Thus, in addition to providing for mobility of a configuration, the dynamic values provide for ease in maintenance of the configuration because the elements adapt to reflect the current state of the system.

In a conventional system, it is not generally possible to copy a configuration from one system to another or to generate a configuration that is usable for multiple different computer systems because of system dependencies. A conventional system will utilize a static configuration having set elements, and a static configuration will not transfer from one system to another system in the same form as was used in the original system. In conventional operations, it is necessary to manually modify each of the system dependent configuration elements to make such elements match the new system. Further, because of the system dependencies and the need to create new values for each configuration, there is no assurance in a conventional process that the same configuration will work in the same way in two systems after all of the elements have been set.

In an embodiment of the invention, a configuration is abstracted to eliminate the system dependencies in the configuration. In an embodiment, any system environment dependent settings are removed from a configuration database. Instead of static configuration values, a configuration introduces dynamic elements to reflect any current system. The dynamic elements may include parameters that characterize each system that receives the configuration. Parameters may include, but are not limited to, host names, instance names, the number of CPUs, the amount of available memory, and other hardware and software elements. In an embodiment of the invention, a configuration is dynamic and adapts itself to the system environment, thereby enabling the movement of the configuration from one system environment to another. In an embodiment, the only static settings that may exist in a configuration are non-system dependent settings that thus are not tied to any particular system.

In an embodiment, a configuration element or agent will evaluate abstract configuration elements and substitute the needed values into the configuration to reflect the characteristics of the system that is receiving the configuration. In one embodiment of the invention, a configuration machine or configuration manager will evaluate the abstract configuration elements and determine the values of the configuration elements for the relevant computer system. A configuration machine or manager may be, for example, an API (application program interface) that operates on top of a database for a system. In an embodiment, the configuration manager transparently evaluates the configuration values at run-time to adapt the configuration to the system. However, embodiments of the invention are not limited to any particular component, device, or process for the resolution of configuration elements, but rather include any internal or external agent that can process the configuration elements for a computer system.

In an embodiment of the invention, an abstract configuration may be created using various different processes. In one embodiment, API methods of a configuration manager may be used directly to generate the abstract configuration. In another embodiment a specially tagged property file, such as a JavaProperty file, may be imported into the configuration manager. For example, an enhanced property file may be imported as a property sheet into a configuration database. Other methods of generating the abstract configuration may be utilized, and embodiments of the invention are not limited to any particular generation process.

In an embodiment, system dependencies may include any characteristic of a system that may be found in a configuration. Dependencies may include system identification data, system information such as heap size and number of nodes, and hardware availability such as number of CPUs. Each system dependency is expressed in an abstract form in the virtualized configuration in a manner that does not refer to any particular system. The form of the elements in a virtualized configuration may vary in different embodiments. For example, system dependencies may include parameters that are substituted, parameters that require calculation, parameters that rely on or refer to other values, or other types of direct or indirect values.

In an embodiment of the invention, system configurations may include various default values that are substituted as the values are resolved for a particular computer system. In addition, configuration may be dependent on the intended use of a computer system. Various defaults or settings may be established for different types of uses. The different use cases may be addressed in various ways. In one example, templates, forms, or similar devices may be provided to establish certain parameter values for a configuration.

In an embodiment of the invention, configurations may be structured or developed in multiple levels, with, for example, "higher" levels providing default and abstract elements, which are shippable across system boundaries. In this example, an upper configuration level is applicable to all systems, but may, for instance, be overridden by lower level configuration levels in certain cases.

In one embodiment, below an upper configuration level may be a usage defined level, or template level, that provides configuration elements designed for particular use cases. In an embodiment of the invention a system provides for predefined configurations, which may include the use of templates, forms, or similar devices. The usage defined level may override upper level defaults. In an embodiment, the usage defined level is based on the system usage and not the particular system and thus the elements remain abstract for purposes of evaluation in conjunction with the characteristics of the receiving system. The different use cases may, for example, enable and disable components as needed for the particular use case. In one possible example, a developer may wish to turn off much of a system, minimizing the number of nodes, to maximize the system power available to the developer. In another example, a usage case may require enablement of all server nodes to enable the use of a portal that will carry a large amount of traffic.

In an embodiment of the invention, below the usage defined level may be a system level, which is based on the individual system instance. The system level includes defining the actual system instances belonging to the system. In an embodiment, each system instance derives its configuration from the template level. The settings received from the template level are abstract and dynamically resolved during runtime according to the given system context, which is attached to the system. Thus, in an embodiment of the invention a configuration is self-adapting to the particular system environment. In an embodiment, on the system level customizations might be made that are system specific and thus could be done in a generic or abstract manner on the template level. The system level defines the actual system instances belonging to the system. Each system instance derives its configuration from the template level. These derived settings will still be abstract and dynamically resolved during runtime according to the given system context, which is attached to the system. Thus, the configuration is self-adapting to the particular system environment. On the system level customizations might be done which are system specific and which could not be done in a generic (or abstract) way on the system or template level.

The system level may further include a custom level above the individual instance, with the custom level providing customization of the configuration for application to a particular site. In an embodiment, an additional modification may exist between the default level and the usage case level to provide customization that affects all use cases. Thus, customization may be done either for all instances at a higher level, or at the individual instance level.

In an embodiment of the invention, the technical configuration of a Java system is simplified through the use of virtualized and adaptive configuration. Embodiments of the invention may be described herein in terms of Java objects and processes. However, embodiments of the invention are not limited to any particular system environment. Embodiments of the invention may be applied to any computer environment which includes the use of a configuration or similar structure with one or more system dependent elements.

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Other embodiments may be implemented in the context of various different software platforms including, by way of example, Microsoft .NET, Windows/NT, Microsoft Transaction Server (MTS), the Advanced Business Application Programming ("ABAP") platforms developed by SAP AG, and other computer platforms.

Figure 1:
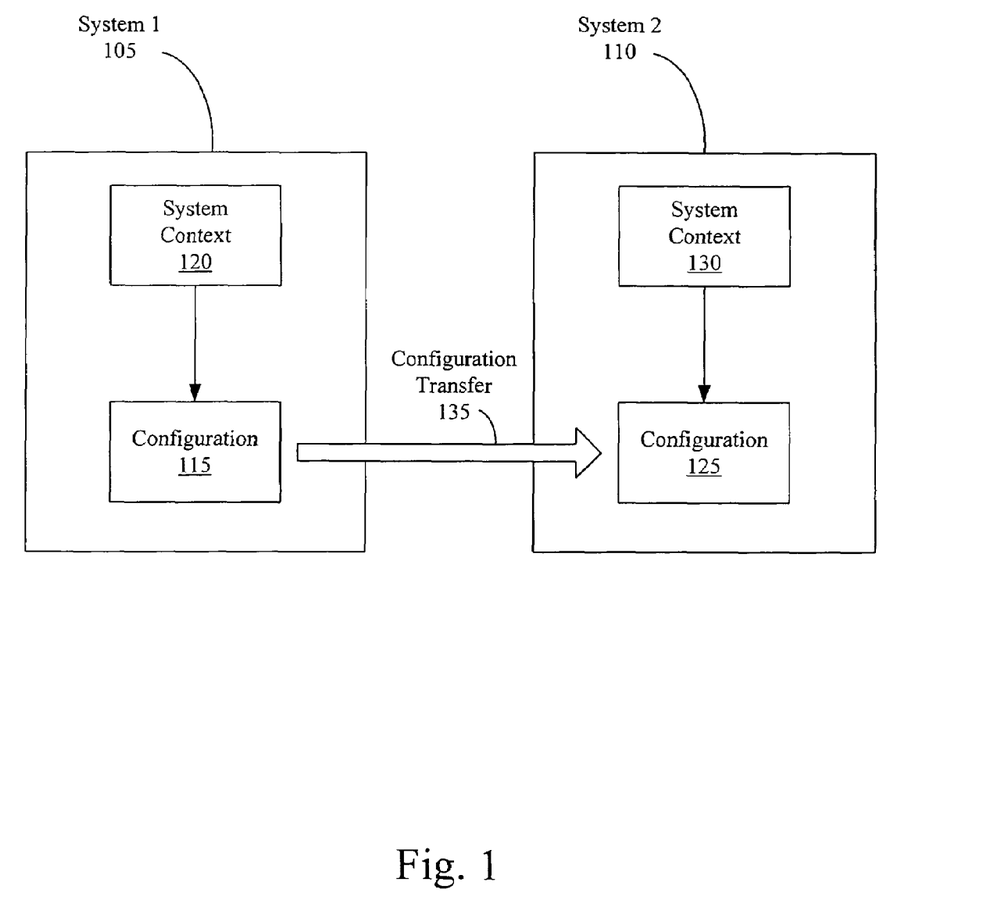
FIG. 1 is an illustration of the transfer of a configuration in an embodiment of the invention.

FIG. 1 is an illustration of the transfer of a configuration in an embodiment of the invention. In this illustration, a first computer system (system 1 105) has a particular configuration 115 that is based at least in part on the system context 120, which includes such elements as the system name, the instance host name, the number of CPUs, the amount of memory available, and other related system factors.

A second computer system (system 2 110) also contains a configuration 125 that is based at least in part on the system context 130 of the second system 110. If the configuration 115 of the first system 105 has been developed and would be useful in the second system, then there is an incentive to transfer the configuration 135 and thus to re-use the development efforts that went into generating the configuration 115. However, in a conventional process, a configuration generally cannot not be easily copied or transferred because the elements of the configuration are based on the specific system context 120 of the first system 105. In order to perform the transfer of the configuration, the resulting configuration 125 for the second system 110 would have to be modified and corrected to match the system context 130 of the second system 110, which may be a very time consuming process.

In an embodiment of the invention, a configuration is developed as a virtualized, adaptable configuration that is based on abstract configuration data, and that does not contain any system dependent elements. In this embodiment, the abstract configuration may be provided to the second system 110. The elements of the abstract configuration would be resolved based on the system context 130 of the second system 130 to form the configuration 125 for the second system 110. In an embodiment, it is possible to transfer 135 an adaptable configuration 115 of the first system 105 to the second system 110, or to develop a configuration that is usable in both systems. The abstract and adaptable nature of such virtualized configuration allows for transfer without first making corrections and modifications to the configuration.

In an embodiment of the invention, the transferred configuration 125 will be automatically resolved, such as through use of a configuration machine or engine. The automatic resolution process may include the transformation of any indirect references, calculated references, and other parameters as needed to match the system context 130 of the second system 110.

Figure 2:
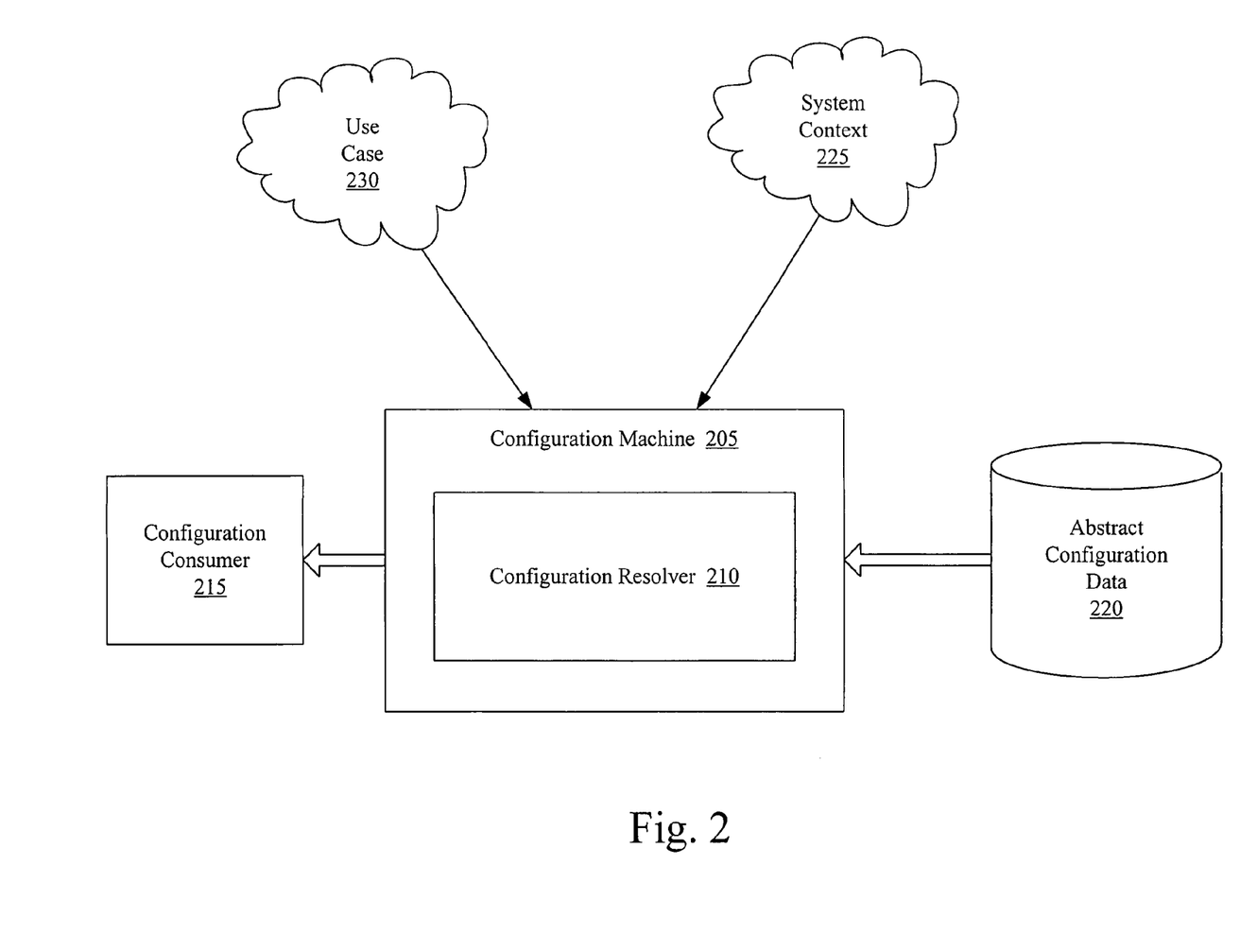
FIG. 2 is an illustration of an embodiment of a system for generation of a configuration.

FIG. 2 is an illustration of an embodiment of a system for generation of a configuration. In this illustration, a configuration machine 205 is used to provide a configuration to a consumer of the configuration 215. The consumer may be any component, device, or system that requires a configuration for a particular use. In an embodiment of the invention, a database includes abstract configuration data 220, the abstract data being configuration elements that are not tied to any particular system, but rather are adaptable to a system that receives the configuration. For example, the same abstract configuration data may be used in multiple different systems even though the systems have different system characteristics that require different configuration elements.

In an embodiment of the invention, a configuration machine 205 includes a configuration resolver 210. The configuration machine 205 receives the abstract configuration data 220 and the configuration resolver 210 resolves the elements of the abstract configuration data to apply to a particular system, in this case including the configuration consumer 215. The configuration is resolved based at least in part on the system context 225 of the relevant system, which includes relevant data regarding the particular system 215 that is to receive the configuration.

In an embodiment of the invention, a configuration may also be based on the particular use case intended for the system 230. Thus, the configuration may be formed based at least in part on the particular use case of the configuration consumer 215. The use case may provide certain system default elements that are designed for particular uses of a system.

Figure 3:
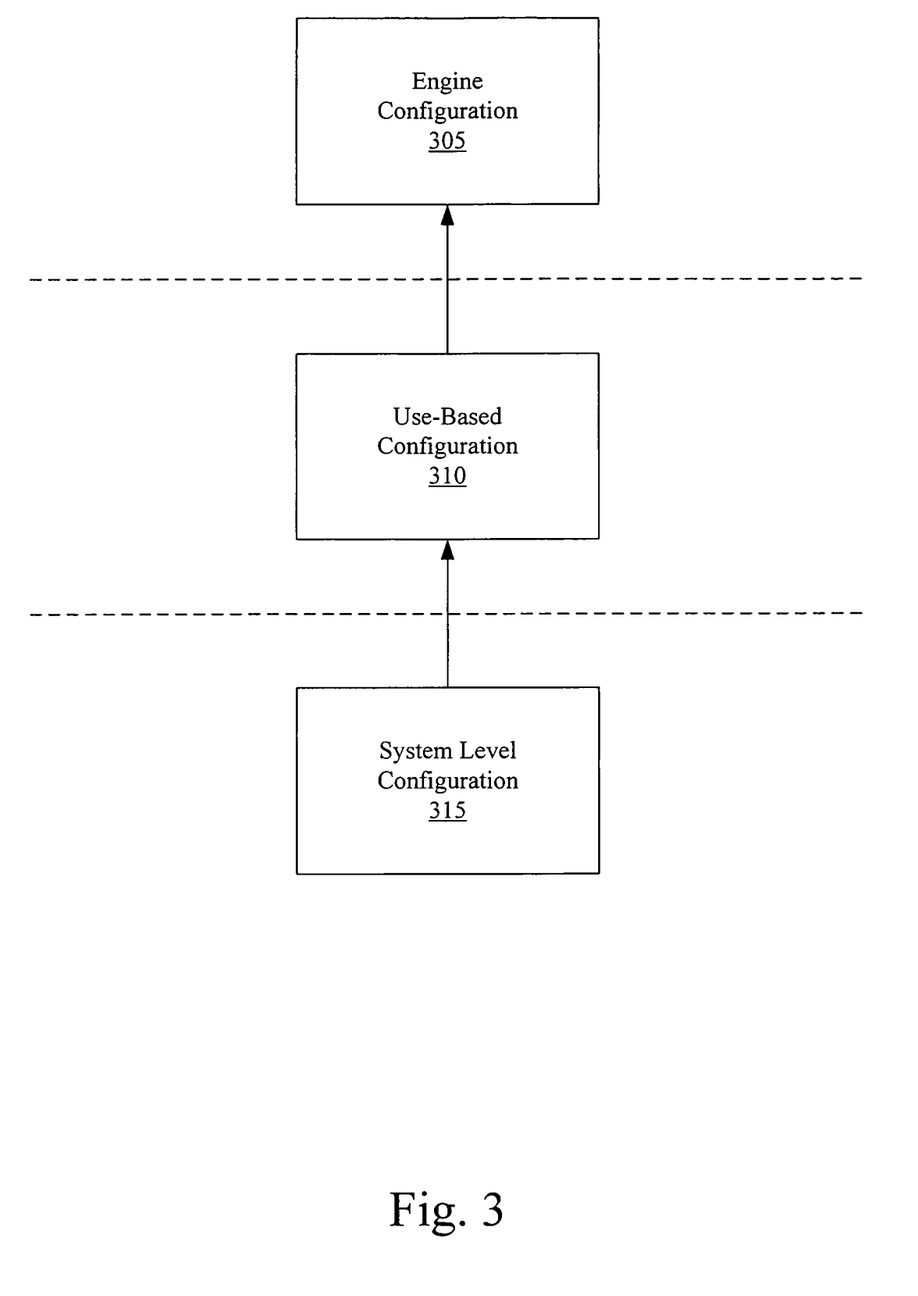
FIG. 3 is an illustration of an embodiment of configuration development.

FIG. 3 is an illustration of an embodiment of configuration development. In an embodiment of the invention, a configuration may be developed in levels, with upper levels providing defaults that may be overridden in lower levels. In an embodiment of the invention, a configuration may inherit elements from upper levels. In one example, an engine level configuration 305 may represent a basic default configuration that is not designed for any particular use or system. The configuration may include abstract elements that are structured as required for a configuration engine or machine that will resolve the elements for a particular system.

In this example, a use-based (or template) configuration level 310 then defines configurations that are based at least in part on an intended use for a system. This level may provide settings that are appropriate for a particular purpose, which may then be modified as appropriate. In one example, the use-based configuration level may provide that a certain number of nodes be turned on for the purpose of a particular use case.

A system level configuration 315 inherits a configuration from the use-based configuration level. In some instances, the configuration may be further customized at the system level. The system level defines the actual system instances belonging to the system, with each system instance deriving its configuration from the template level. The derived settings remain abstract and are dynamically resolved during runtime according to the given system context attached to the system. In this manner, a configuration is self-adapting to the particular system environment. On the system level, customizations may be implemented that are system specific, and that could not be accomplished in a generic or abstract manner in an engine level or template level configuration.

Figure 4:
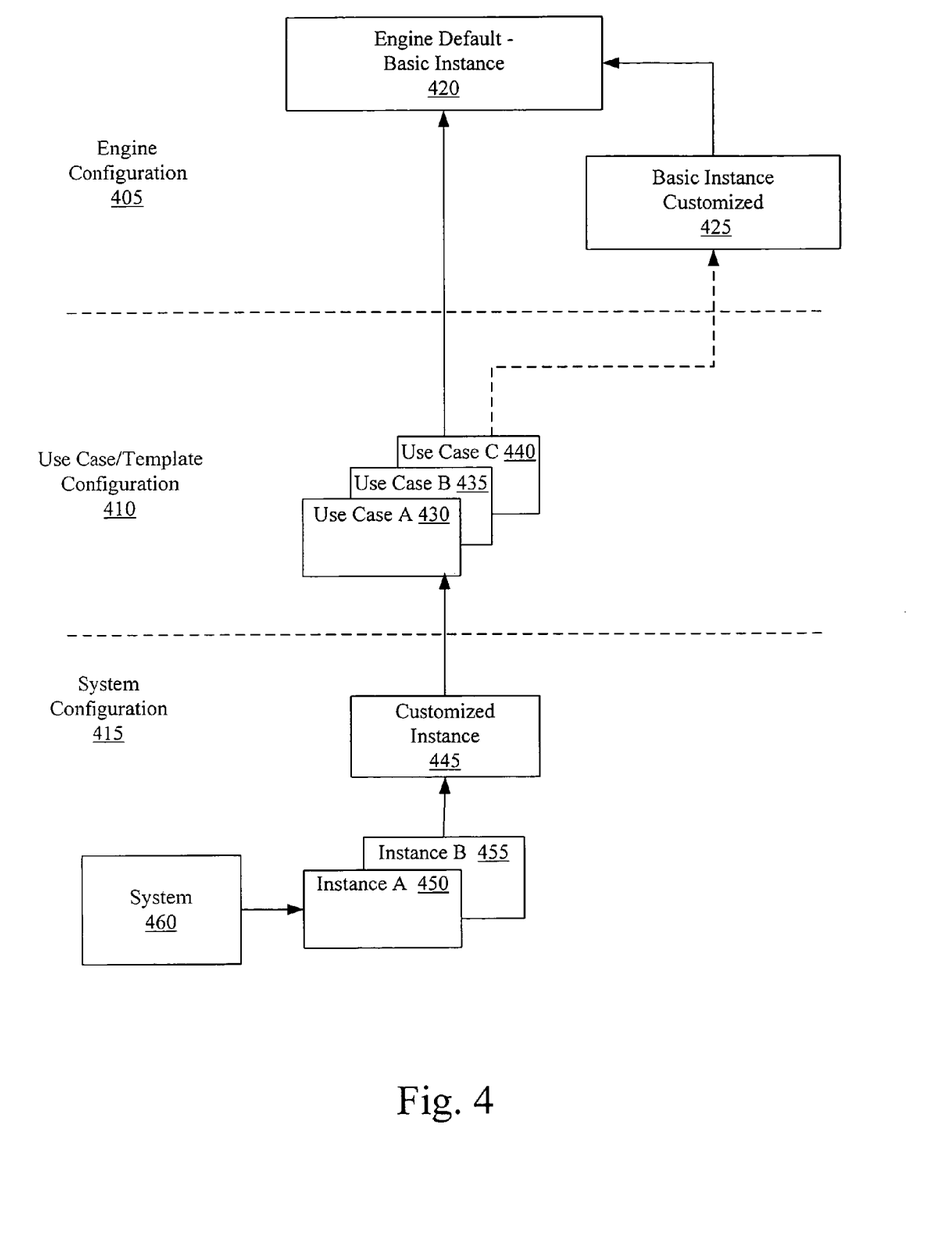
FIG. 4 is an illustration of an embodiment of configuration development.

FIG. 4 is an illustration of an embodiment of configuration development. In FIG. 4 a particular example of configuration development is described, but embodiments of the invention are not limited to this particular structure.

In this illustration, an engine configuration level 405 is illustrated. At this level a configuration engine default configuration is formed 420, which provides a basic instance of the configuration. The basic instance is a virtualized configuration that is abstract and is not tied to any particular system or used case. In one example, a customization of the basic instance 425 may be provided, such customization providing a possible modification of all configuration instances for a system regardless of the particular use of the system.

Also illustrated in FIG. 4 is a use case configuration, the use case providing the configuration for various different uses of a system, which are illustrated here as Use Case A 430, Use Case B 435, and Use Case C 440. Each use case provides a template or form for a configuration for a particular use of a system. The use case configuration remains an abstract level that is not tied to a particular system.

A system configuration is also illustrated, including one or more different configuration instances, such as Instance A 450 and Instance B 455. In an embodiment of the invention, the context information for the configuration instances will be accessed in the system context. In an embodiment, the system configurations contain information about the instances that are part of the system, and may further include customizations that could not be defined on an abstract level. In this illustration, the system configuration may also include a customized instance 445, which provides customization for instances received for various different use cases. In other embodiments, there may be multiple customized instances, depending on the particular type of configuration being established.

Figure 5:
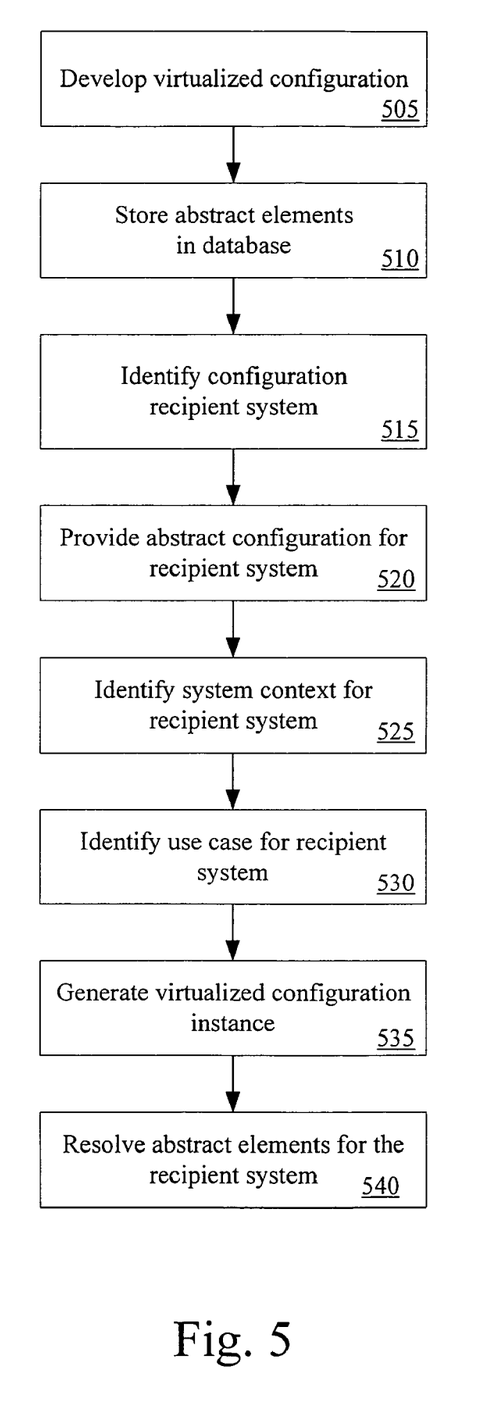
FIG. 5 is a flowchart to illustrate an embodiment of configuration generation.

FIG. 5 is a flowchart to illustrate an embodiment of configuration generation. In this illustration, a virtualized configuration is developed 505, the virtualized configuration including one or more abstract elements that are not tied to any particular computer system. In an embodiment, the virtualized configuration is adaptable, with the abstract elements intended to be resolved to reflect appropriate values for a system that is receiving a configuration.

In this illustration, the abstract elements may be stored in a database 510, although the process of building up a configuration may vary in different embodiments of the invention. A recipient system for the configuration is identified 515, and an abstract configuration is provided for the recipient system 520. A configuration engine or other agent may be responsible for generating the configuration and resolving the abstract elements of the configuration. As a part of this process, the system context is identified for the recipient system 525, which thus provides the characteristics of the system for purposes of resolving the configuration elements. A use case may also be identified 530, which may be applicable if a form or template is available to establish a customized configuration.

A virtualized configuration instance is then generated 535. The configuration engine resolves the abstract elements of the configuration instance for the recipient system 540. In this manner, the configuration adapts to the recipient system, with resolution taking place during runtime within the recipient system.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    generating a self-adapting system configuration, the configuration including a setting for a system dependent element, the setting having an abstract value to be resolved based at least in part on a characteristic of a system receiving the system configuration;
    installing the configuration in a recipient system;
    resolving the value for the setting for the recipient system based at least in part on a characteristic of the recipient system, wherein resolution of the value of the setting occurs at runtime for the recipient system; and
    dynamically adapting the system configuration by changing the value of the setting based at least in part on a change in the characteristic of the recipient system.

2. The method of claim 1, further wherein the configuration is adaptable to a plurality of different systems.

3. The method of claim 1, further comprising installing the configuration in a second system and resolving the setting for the second recipient system based at least in part on a characteristic of the second recipient system, the value of the setting for the second recipient system being different than the value of the setting for the recipient system.

4. The method of claim 3, wherein installing the configuration in the second system includes transferring the configuration from the recipient system to the second recipient system without making any modifications to the configuration.

5. The method of claim 1, further comprising obtaining an abstract element from a database for the setting.

6. A server comprising:
    a database to contain a set of abstract configuration elements for a configuration; and
    a resolving engine to receive an abstract configuration element from the set of abstract configuration elements, the resolving engine to resolve a value for the abstract configuration element at runtime for a recipient system, the value to be resolved for the purposes of the recipient system for the; and
    a set of characteristic values for the recipient system, the resolving engine to obtain a characteristic value from the set of characteristic values and to resolve the abstract configuration element based at least in part on the characteristic value;
    wherein the resolving engine is to dynamically adapt the system configuration by changing the value of the abstract configuration element based at least in part on a change in the characteristic value for the recipient system.

7. The server of claim 6, wherein the resolving engine is to resolve a value for the abstract configuration element for the purposes of a second recipient system to receive the configuration, the second recipient system being different than the recipient system.

8. The server of claim 6, wherein the resolving engine comprises an API (application program interface).

9. The server of claim 8, wherein API methods of the resolving engine are used to generate a runtime configuration out of the abstract configuration elements of the configuration.

10. The sewer of claim 6, wherein the only static settings included in the configuration are non-system dependent settings.

11. The sewer of claim 6, wherein the server is a Java 2 Enterprise Edition ("J2EE") compatible server that supports Enterprise Java Bean ("EJB") components.

12. A computer-readable medium having stored thereon data representing sequences of instructions that, when executed by a processor, cause the processor to perform operations comprising:
   producing a configuration for a recipient system, the configuration including an element with a value that is to be resolved based at least in part on a system characteristic;
   determining a recipient system for the configuration;
   resolving the value of the element of the configuration at runtime for the recipient system based at least in part on a characteristic of the recipient system; and
   dynamically adapting the system configuration by modifying the value of the element of the configuration based on a modification in the characteristic of the recipient system.

13. The medium of claim 12, wherein the produced configuration does not contain any element that is dependent on the system that receives the configuration.

14. The medium of claim 13, wherein the characteristic of the second recipient system is different than the characteristic of the recipient system.

15. The medium of claim 12, farther comprising instructions that, when executed by a processor, cause the processor to perform operations comprising:
   determining a second recipient system for the configuration; and
   resolving the value of the element of the configuration based on a characteristic of the second recipient system.

16. The medium of claim 12, wherein the resolution of the elements of the configuration is done by a configuration machine.

* * * * *